United States Patent
White et al.

(12)

(10) Patent No.: US 6,518,330 B2
(45) Date of Patent: Feb. 11, 2003

(54) MULTIFUNCTIONAL AUTONOMICALLY HEALING COMPOSITE MATERIAL

(75) Inventors: Scott R. White, Champaign, IL (US); Nancy R. Sottos, Champaign, IL (US); Philippe H. Geubelle, Champaign, IL (US); Jeffrey S. Moore, Savoy, IL (US); Suresh R. Sriram, Urbana, IL (US); Michael R. Kessler, Urbana, IL (US); Eric N. Brown, Champaign, IL (US)

(73) Assignee: Board of Trustees of University of Illinois, Urbana, IL (US)

( * ) Notice: Subject to any disclaimer, the term of this patent is extended or adjusted under 35 U.S.C. 154(b) by 0 days.

(21) Appl. No.: 09/782,609

(22) Filed: Feb. 13, 2001

(65) Prior Publication Data

US 2002/0111434 A1 Aug. 15, 2002

(51) Int. Cl.⁷ .............................. C08J 3/00; C08K 9/10
(52) U.S. Cl. ................... 523/200; 523/205; 428/402.21
(58) Field of Search ................................ 523/200, 205; 428/402.21

(56) References Cited

U.S. PATENT DOCUMENTS

| | | | |
|---|---|---|---|
| 3,041,289 A | 6/1962 | Katchen et al. | |
| 3,069,370 A | 12/1962 | Jensen et al. | ................... 260/23 |
| 4,080,238 A | 3/1978 | Wolinski et al. | ............. 156/305 |
| 4,301,306 A | 11/1981 | Layer | |
| 4,324,717 A | 4/1982 | Layer | |
| 4,380,617 A | 4/1983 | Minchak et al. | |
| 4,708,969 A | 11/1987 | Leach | |
| 4,755,588 A | 7/1988 | Vallance et al. | ............. 528/371 |
| 4,758,400 A | 7/1988 | Dunnavant et al. | |
| 4,804,427 A | 2/1989 | Paul et al. | |
| 4,902,560 A | 2/1990 | Silver | |
| 4,943,621 A | 7/1990 | Janda et al. | |
| 5,063,103 A | 11/1991 | Sugawara et al. | |
| 5,312,940 A | 5/1994 | Grubbs et al. | |
| 5,324,616 A | 6/1994 | Sacripante et al. | .......... 430/137 |
| 5,342,909 A | 8/1994 | Grubbs et al. | |
| 5,427,880 A | 6/1995 | Tamura et al. | |
| 5,561,173 A | 10/1996 | Dry | |
| 5,575,841 A | 11/1996 | Dry | |
| 5,660,624 A | 8/1997 | Dry | |
| 5,789,494 A | * 8/1998 | Hand et al. | ................. 525/453 |
| 5,801,033 A | 9/1998 | Hubbell et al. | .............. 435/182 |
| 5,803,963 A | 9/1998 | Dry | |
| 5,840,238 A | 11/1998 | Setiabudi et al. | |
| 5,958,325 A | 9/1999 | Seemann, III et al. | |
| 5,989,334 A | 11/1999 | Dry | |
| 6,001,909 A | 12/1999 | Setiabudi | |
| 6,040,363 A | 3/2000 | Warner et al. | |
| 6,048,488 A | 4/2000 | Fink et al. | |
| 6,075,072 A | * 6/2000 | Guilbert et al. | |
| 6,100,323 A | 8/2000 | Setiabudi et al. | |
| 6,258,870 B1 | 7/2001 | Hubbell et al. | ............... 522/26 |
| 6,261,360 B1 | 7/2001 | Dry | |

FOREIGN PATENT DOCUMENTS

| | | |
|---|---|---|
| DE | 4209031 | 9/1993 |
| EP | 0349855 | 1/1989 |
| EP | 0669368 | 8/1995 |
| EP | 0 424 833 B1 | 1/1996 |
| WO | WO 93/20111 | 10/1993 |
| WO | WO 96/16100 | 3/1996 |
| WO | WO 96/20235 | 7/1996 |
| WO | WO 97/25360 | 7/1997 |
| WO | WO 99/55753 | 11/1999 |
| WO | WO 99/55794 | 11/1999 |

OTHER PUBLICATIONS

Stevens, M.P. *Polymer Chemistry*, 1999, pp. 184–186.
Stevens, M.P. *Polymer Chemistry*, 1999, pp. 378–381.
Dry, C. and McMillan, W. *Three–part methylmethacrylate adhesive system as an internal delivery system for smart responsive concrete*, 1996, 297–300.
Dry, C. *Smart Mater. Struct.* 1994, 3, 118–123.
Dry, C. *Composite Structures* 1996, 35, 263–269.
Jung, D. et al. *MD–vol. 80, Composites and Functionally Graded Materials*, ASME 1997, 265–275.
Beckwith, S.W. and Hyland, C.R. *SAMPE Journal* 1998, 34/6, 7–19.
Grubbs, R.H. and Chang, S. *Tetrahedron* 1998, 54, 4413–4450.
Dias, E.L. et al. *J. Am. Chem. Soc.* 1997, 119, 3887–3897.
Breslow, D.S. *Prog. Polym. Sci.* 1993, 18, 1185–1195.
Dias, E.L. and Grubbs, R.H. *Organometallics* 1997, 17, 2758–2767.
Weck, M. et al. *Macromolecules* 1997, 30, 6430–6437.
Fraser, C. and Grubbs, R.H. *Macromolecules* 1995, 28, 7248–7255.
Bazan, G.C. et al. *Macromolecules* 1991, 24, 4495–4502.
Li, Victor C. et al. *Composites Part B* 1998, 29B, 819–827.

* cited by examiner

Primary Examiner—James J. Seidleck
Assistant Examiner—Olga Asinovsky
(74) Attorney, Agent, or Firm—Sonnenschein Nath & Rosenthal

(57) ABSTRACT

A composite material, contains a polymer, a polymerizer, a corresponding catalyst for the polymerizer, and a plurality of capsules. The polymerizer is in the capsules. The composite material is self-healing.

12 Claims, 2 Drawing Sheets

MULTIFUNCTIONAL AUTONOMICALLY HEALING COMPOSITE MATERIAL

FEDERALLY SPONSORED RESEARCH OR DEVELOPMENT

The subject matter of this application may in part have been funded by the Air Force (AFOSR Grant no. F49620-00-1-0094/White). The government may have certain rights in this invention.

BACKGROUND

The present invention relates to self-healing composite materials.

Thermosetting polymers, used in a wide variety of applications ranging from microelectronics to composite airplane wings, are susceptible to damage in the form of cracking. Often these cracks form deep within the structure where detection is difficult and repair is virtually impossible. In fiber reinforced polymer composites, cracking in the form of fiber-matrix interfacial debonding, ply delamination, and simple matrix cracking leads to degradation. In microelectronics, polymer encapsulates and polymer matrix composite printed circuit boards suffer from similar forms of damage, but in addition to mechanical failure, cracks cause electrical failure of the component. Microcracking induced by thermal and mechanical fatigue is a longstanding problem in polymer adhesives. Regardless of the application, once cracks have formed within polymeric materials, the integrity of the structure is significantly compromised. Typically, previously reported methods of successful crack healing require some form of manual intervention.

A proposed method of self-healing is described in "Self-Healing Composites Using Embedded Microspheres" D. Jung et al. *Composites and Functionally Graded Materials* vol. MD-80, in Proceedings of the ASME International Mechanical Engineering Conference and Exposition, 265–275 (1997). The proposed method uses polyoxymethyleneurea (PMU) microspheres to store a crack filling agent to be released into the crack and rebond the crack faces. The repair mechanism uses naturally occurring functional sites in a polyester matrix network to trigger the repair action. Adding a reactive component to trigger the crack filler solidification was specifically investigated in the case of embedded epoxide components and embedded amine groups, and it was found that the amine groups did not retain sufficient activity and was determined to be not feasible. The PMU microcapsules used contained an epoxide monomer.

BRIEF SUMMARY

In a first aspect, the present invention is a composite material, containing: a polymer, a polymerizer, a corresponding catalyst for the polymerizer, and a plurality of capsules. The polymerizer is in the capsules.

In a second aspect, the present invention is a composite material, containing: a polymer, a polymerizer, a corresponding activator for the polymerizer, and a first plurality of capsules. The polymerizer is in the capsules, and the corresponding activator is not a native activating moiety.

In a third aspect, the present invention is a method for making the above composites, including dispersing the capsules and the corresponding catalyst or activator into the polymer.
Definitions A polymerizer is a composition that will form a polymer when it comes into contact with a corresponding activator for the polymerizer. Examples of polymerizers include monomers of polymers such as styrene, ethylene, (meth)acrylates, and dicyclopentadiene (DCPD); a monomer of a multimonomer polymer system such as diols, diamines, and epoxide; and prepolymers such as partially polymerized monomers still capable of further polymerization.

An activator is anything that when contacted or mixed with a polymerizer will form a polymer. Examples of activators are catalysts, initiators, and native activating moieties. A corresponding activator for a polymerizer is an activator that when contacted or mixed with that specific polymerizer will form a polymer.

A catalyst is a compound or moiety that will cause a polymerizable composition to polymerize, and is not always consumed each time it causes polymerization. This is in contrast to initiators and native activating moieties. Examples of catalysts include ring opening polymerization (ROMP) catalysts such as Grubbs catalyst. A corresponding catalyst for a polymerizer is a catalyst that when contacted or mixed with that specific polymerizer will form a polymer.

An initiator is a compound that will cause a polymerizable composition to polymerize, and is always consumed at the time it causes polymerization. Examples of initiators are peroxides (which will form a radical to cause polymerization of an unsaturated monomer); a monomer of a multi-monomer polymer system such as diols, diamines, and epoxide; and amines (which will form a polymer with an epoxide). A corresponding initiator for a polymerizer is an initiator that when contacted or mixed with that specific polymerizer will form a polymer.

A native activating moiety is a moiety of a polymer that when mixed or contacted with a polymerizer will form a polymer, and is always consumed at the time it causes polymerization. Examples of a native activating moiety is an amine moiety (which will form a polymer with an epoxide).

A compound is a molecule that contains at most 100 repeating units. This is in contrast to a polymer, which contains more than 100 repeating units.

A capsule is a hollow closed object having an aspect ratio of 1:1 to 1:10. The aspect ratio of an object is the ratio of the shortest axis to the longest axis; these axes need not be perpendicular. A capsule may have any shape that falls within this aspect ratio, such as a sphere, a toroid, or an irregular ameboid shape. The surface of a capsule may have any texture, for example rough or smooth.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION

Figure 1:
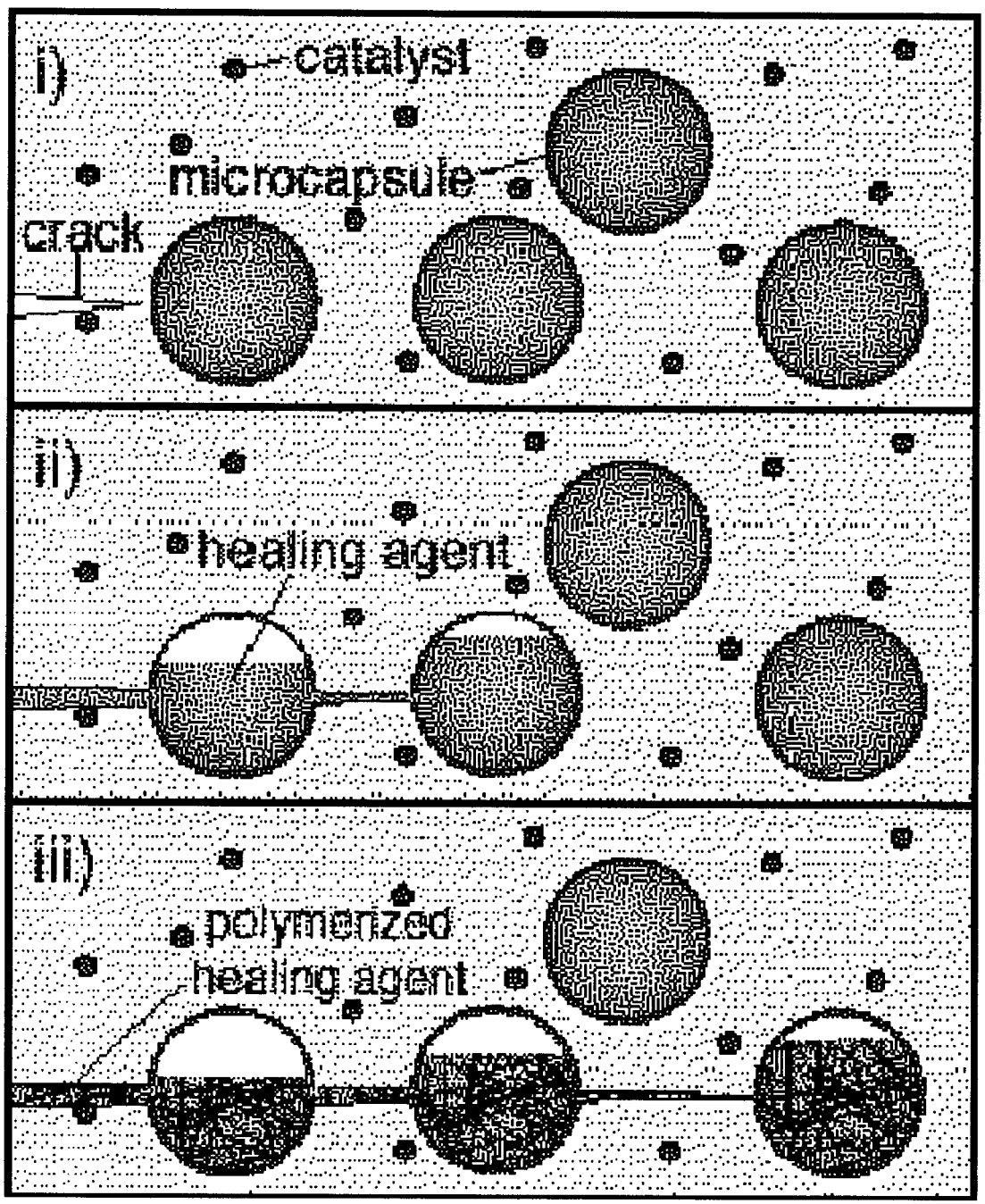
FIG. 1 illustrates an embodiment of a self-healing composite.

Further investigations by the group that published "Self-Healing Composites Using Embedded Microspheres" found that the use of natural functionality was, in fact, not feasible. Approaches that had been previously eliminated were reconsidered, resulting in the discovery that systems that do not use a corresponding native activating moiety will allow for a self-healing composite. Preferably, systems that use a catalyst added to the polymer are used. Not only can damage to the composite be repaired, but also in some cases the achieved healed strengths are greater than the strength of the original matrix material.

The present invention includes a composite material, containing capsules in a polymer. The capsules contain a polymerizer, and the composite material includes an activator that is not a corresponding native activating moiety. Preferably, the activator is a corresponding catalyst for the polymerizer. When a crack forms in the composite material, some of the capsules are broken, and the polymerizer moves into the crack, coming into contact with the activator and forming a polymer. This repairs the crack.

The capsules contain a polymerizer. The polymerizer contains a polymerizable compound such as a monomer or prepolymer, and may optionally contain other ingredients, such as other monomers and/or prepolymers, stabilizers, solvents, viscosity modifiers such as polymers, odorants, colorant and dyes, blowing agents, antioxidants, and co-catalysts. Preferably, the polymerizer is a liquid.

The polymer contains both capsules and a corresponding activator for the polymerizer. Preferably, the activator is a catalyst or an initiator. Examples of polymerizable compounds are cyclic olefins, preferably containing 4–50 carbon atoms and optionally containing heteratoms, such as DCPD, substituted DCPDs, norbornene, substituted norbornene, cyclooctadiene, and substituted cyclooctadiene. Corresponding catalysts for these are ring opening metathesis polymerization (ROMP) catalysts such as Schrock catalysts (Bazan, G. C.; Schrock, R. R.; Cho, H.-N.; Gibson, V. C. *Macromolecules* 24, 4495–4502 (1991)) and Grubbs catalysts (Grubbs, R. H.; Chang, S. *Tetrahedron* 54, 4413–4450 (1998)).

Another example of polymerizable compounds are lactones such as caprolactone, and lactams, that when polymerized will form polyesters and nylons, respectively. Corresponding catalysts for these are cyclic ester polymerization catalysts and cyclic amide polymerization catalysts, such as scandium triflate.

Furthermore, a polymerizer may contain a polymerizable compound and one part of a two-part catalyst, with a corresponding initiator being the other part of the two-part catalyst. For example, the polymerizable compound may be a cyclic olefin; one part of a two-part catalyst may be a tungsten compound, such as an organoammonium tungstate, an organoarsonium tungstate, or an organophosphonium tungstate; or a molybdenum compound, such as organoammonium molybdate, an organoarsonium molybdate, or an organophosphonium molybdate. The second part of the two-part catalyst may be an alkyl aluminum compound, such as an alkoxyalkylaluminum halide, an aryloxyalkylaluminum halide, or a metaloxyalkylaluminum halide in which the metal in the compound is tin, lead, or aluminum; or an organic tin compound, such as a tetraalkyltin, a trialkyltin hydride, or a triaryltin hydride.

In another such system, the polymerizable compound may be unsaturated compounds such as acrylates; acrylic acids; alkyl acrylates; alkyl acrylic acids; styrenes; isoprene; and butadiene. In this case, atom transfer radical polymerization (ATRP) may be used, with one of the two components being mixed with the polymerizable compound and the other acting as the initiator: one component being an organohalide such as 1-chloro-1-phenylethane, and the other component could be a copper(I) source such as copper(I) bipyridyl complex. Alternatively, one component could be a peroxide such as benzoyl peroxide, and the other component could be a nitroxo precursor such as 2,2,6,6-tetramethylpiperidinyl-1-oxy (TEMPO). These systems are described in Malcolm P. Stevens; *Polymer Chemistry: An Introduction*, 3rd Edition; New York: Oxford University Press, 1999, p. 184–186

In another such system, the polymerizable compound may contain isocyanate functional groups (—N=C=O) with hydroxyl functional groups (—OH). For this system, the polymerizable material may for example be a compound containing both an isocyanate group and a hydroxyl group, or two different compounds, one compound containing at least two isocyanate groups and the other compound containing at least two hydroxyl groups. The reaction between an isocyanate group and a hydroxyl group can form a urethane linkage (—N—C(=O)—O—) between the compounds, possibly releasing carbon dioxide. This carbon dioxide can provide for the creation of expanded polyurethane foam; optionally the polymerizer may contain a blowing agent, for example a volatile liquid such as dichloromethane. In this case, condensation polymerization may be used, with one of the two components being mixed with the polymerizable compound and the other acting as the initiator: for example, one component could be an alkyltin compound such as stannous 2-ethylhexanoate, and the other component could be a tertiary amine such as diazabicyclo [2.2.2]octane (DABCO). These systems are described in Malcolm P. Stevens; *Polymer Chemistry: An Introduction*, 3rd Edition; New York: Oxford University Press, 1999, p. 378–381.

Optionally, the activator, such as the catalyst or initiator may also be in a separate set of capsules. Furthermore, this separate set of capsules may also contain stabilizers, solvents, viscosity modifiers such as polymers, odorants, colorant and dyes, blowing agents, antioxidants, and co-catalysts. Optionally, a set of capsules may be present that contain one or more additional ingredients, such as stabilizers, solvents, viscosity modifiers such as polymers, odorants, colorant and dyes, blowing agents, antioxidants, and co-catalysts.

The capsules contain a polymerizer. Preferably, the capsules have an average diameter of 10 nm to 1 mm, more preferably 30–500 $\mu$m, most preferably to 50–300 $\mu$m. The capsules have an aspect ratio of 1:1 to 1:10, preferably 1:1 to 1:5, more preferably 1:1 to 1:3, and even more preferably 1:1 to 1:2, and most preferably 1:1 to 1:1.5.

The wall thickness of the capsules is preferably 100 nm to 3 $\mu$m. The selection of capsule walls thickness depends on the polymer in the composite. For example, capsule walls that are too thick will not rupture when a crack approaches, while capsules with very thin walls will break during processing.

The adhesion between the capsules and the polymer of the composite influences whether the capsules will rupture or debond in the presence of an approaching crack. To promote the adhesion between the polymer and capsule wall, various silane coupling agents may be used. Typically, these are compounds of the formula R—SiX$_3$ Where R is preferably a reactive group R$^1$ separated by a propylene group from silicon, and X is an alkoxy group (preferably methoxy), such as R$^1$CH$_2$CH$_2$CH$_2$Si(OCH$_3$)$_3$. Examples include silane coupling agents available from DOW CORNING (with reactive group following the name in parentheses): Z6020 (Diamino); Z6030 (Methacrylate); Z6032 (Styrylamine Cationic); Z6040 (Epoxy); and Z6075 (Vinyl).

To increase the adhesion between the capsules and a polymer in the composite, the capsules may be treated by washing them in a solution of the coupling agent. For example, urea-formaldehyde capsules may be washed in a solution of Silane Z6020 or Z6040 and hexane (1:20 wt.) followed by adding Silane Z6032 to the polymer (1% wt.).

Capsules may be made by a variety of techniques, and from a variety of materials, such as those described in Microencapsulation: Methods and Industrial Applications Ed. Benita, Simon Marcel Dekker, New York, 1996; Microencapsulation: Processes and Applications Ed. Vandegaer, J. Plenum Press, New York, 1974; and Microcapsule Processing and Technology Kondo, A. Marcel Dekker, New York, 1979. Examples of materials from which the capsules may be made, and the techniques for making them include: urea-formaldehyde, formed by in situ polymerization; gelatin, formed by complex coacervation; polyurea, formed by the reaction of isocyanates with a diamine or a triamine, depending on the degree of crosslinking desired (the extent of crosslinking also determines the brittleness of the capsule);and polyamide, formed by the use of a suitable acid chloride and a water soluble triamine.

The polymer may be any polymeric material into which the capsules may be dispersed. Examples include polyamides such as nylons; polyesters such as poly(ethylene terephthalate) and polycaprolactone; polycarbonates; polyethers such as epoxides; polyimides such as polypyromellitimide (for example KAPTAN); phenol-formaldehyde resins (for example BAKELITE); amine-formaldehyde resins such as a melamine resin; polysulfones; poly(acrylonitrile-butadiene-styrene) (ABS); polyurethanes; polyolefins such as polyethylene, polystyrene, polyacrylonitrile, polyvinyls, polyvinyl chloride, poly(DCPD) and poly(methyl methacrylate); polysilanes such as poly(carborane-siloxane); and polyphosphazenes.

The capsules and activator (such as the catalyst or initiator) may be dispersed into the polymer by forming the polymer around the capsules and activator, such as by polymerizing monomer to form the polymer with the capsules and activator mixed into the monomer. Particularly in the case of catalysts, the catalyst may serve as both a catalyst for the polymer and as the corresponding activator for the polymerizer in the capsules. Examples of this system include DCPD as the polymerizer, the polymer is poly(DPCD), and a Grubbs catalyst serves to form the poly(DPCD) and acts as the activator for the DCPD in the capsules; and caprolactone as the polymerizer, the polymer is poly(caprolactone), and scandium triflate acts as the activator for the caprolactone in the capsules.

Alternatively, the polymer may be first formed, and then the capsules and activator mixed in. For example, the polymer may be dissolved in a solvent and the capsules and activator mixed into the solution, followed by removal of the solvent. The activator may be coated onto the capsules prior to dispersing the capsules into the polymer. Furthermore, other components may be added to the polymer, such as fibers, fillers, adhesion modifiers, blowing agents, antioxidants, colorants and dyes, and fragrances.

FIG. 1 illustrates an embodiment of a self-healing composite. An approaching crack ruptures embedded capsules (referred to as microcapsules in the figure) releasing polymerizer (referred to as healing agent in the figure) into the crack plane through capillary action. Polymerization of the healing agent may be triggered by contact with the activator (here a catalyst), bonding the crack faces. The damage-induced triggering mechanism provides site-specific autonomic control of the repair. As shown in FIG. 1, an encapsulated healing agent is embedded in a structural composite matrix containing a catalyst capable of polymerizing the healing agent: (i) cracks form in the matrix wherever damage occurs, (ii) The crack ruptures the microcapsules, releasing the healing agent into the crack plane through capillary action, (iii) The healing agent contacts the catalyst triggering polymerization that bonds the crack faces closed.

EXAMPLES

The following examples and preparations are provided merely to further illustrate the invention. The scope of the invention is not construed as merely consisting of the following examples.

General Procedure for Preparation of Capsules by In Situ Polymerization

In a 600 mL beaker is dissolved urea (0.11 mol, 7.0 g) followed by resorcinol (0.5 g) and ammonium chloride (0.5 g) in water (150 ml). A 5 wt.% solution of ethylene maleic anhydride copolymer (100 mL) is added to the reaction mixture, and the pH of the reaction mixture is adjusted to 3.5 using 10% NaOH solution. The reaction mixture is agitated at 454 rpm, and to the stirred solution is added 60 mL of dicyclopentadiene to achieve an average droplet size of 200 $\mu$m. To the agitated emulsion is added 37% formaldehyde (0.23 mol, 18.91 g) solution, and then the temperature of the reaction mixture is raised to 50° C. and maintained for 2 h. After 2 h, 200 mL of water is added to the reaction mixture. After 4 h, the reaction mixture is cooled to room temperature, and capsules are separated. The capsule slurry is diluted with an additional 200 mL of water and washed with water (3×500 mL). The capsules are isolated by vacuum filtration, and air-dried. Yield:80%. Average size:220 $\mu$m.

Composite Epoxy Specimen Manufacture

The epoxy matrix composite was prepared by mixing 100 parts EPON 828 (Shell Chemicals Inc.) epoxide with 12 parts DETA (diethylenetriamine) curing agent (Shell Chemicals Inc.). Composite epoxy specimens were prepared by mixing 2.5% (by wt.) Grubbs' catalyst and 10% (by wt.) capsules with the resin mixture described above. The resin was then poured into silicone rubber molds and cured for 24 h at room temperature, followed by postcuring at 40° C. for 24 h.

Example

DCPD filled capsules (50–200 $\mu$m average diameter) with a urea-formaldehyde shell were prepared using standard microencapsulation techniques. The capsule shell provides a protective barrier between the catalyst and DCPD to prevent polymerization during the preparation of the composite.

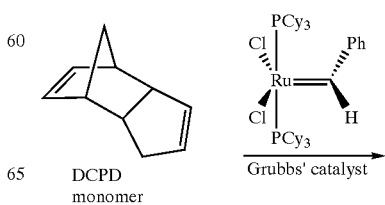

DCPD monomer    Grubbs' catalyst

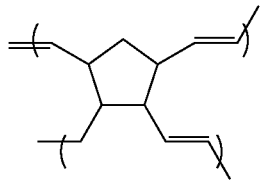
Crosslinked polymer network

The reaction scheme for the polymerization of DCPD is shown below

Figure 2:
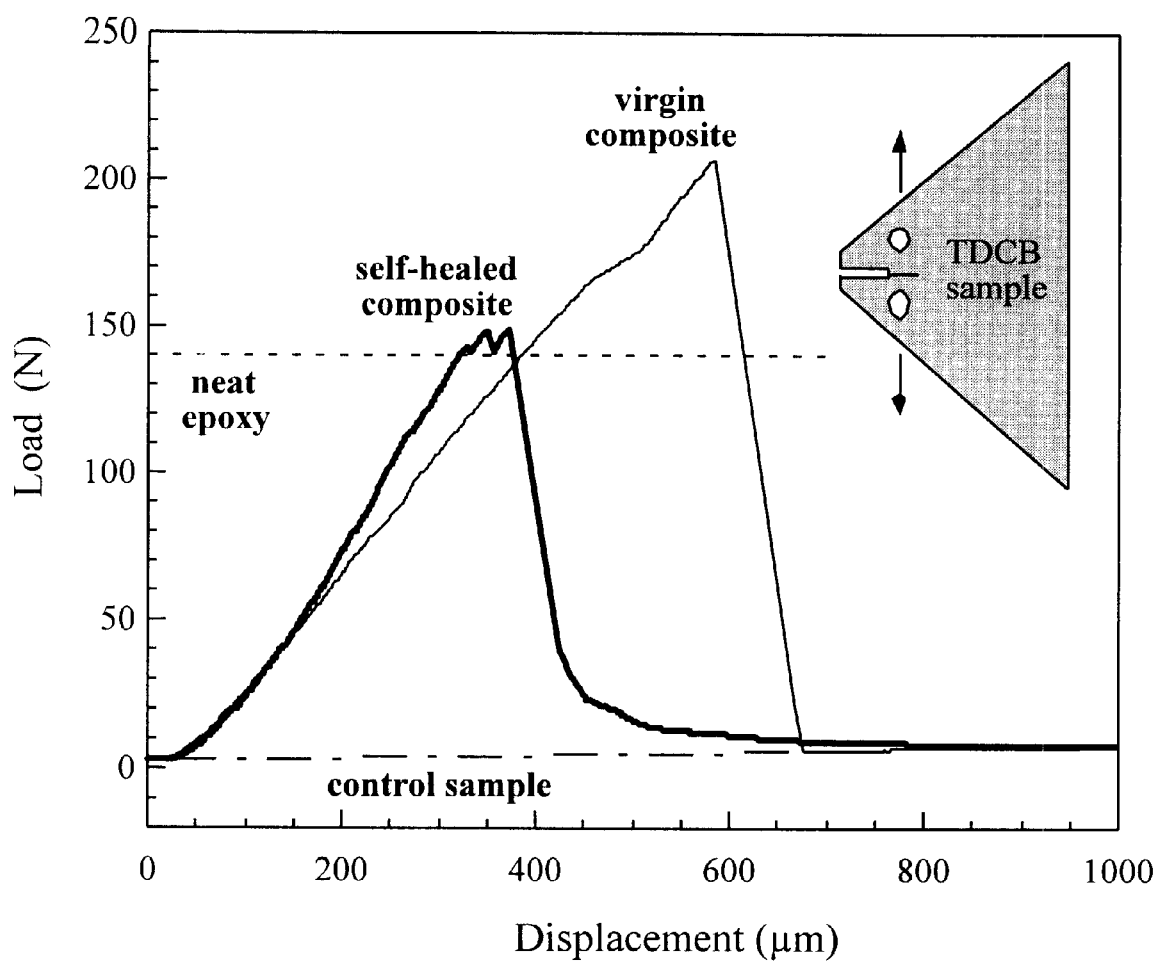
FIG. 2 shows crack healing efficiency of the composite materials.

To assess the crack healing efficiency of these composite materials, fracture tests were performed using a tapered double-cantilever beam (TDCB) specimen (FIG. 2). Self-healing composite and control samples were fabricated. Control samples consisted of: (1) neat epoxy containing no Grubbs' catalyst or capsules, (2) epoxy with Grubbs' catalyst but no capsules and (3) epoxy with capsules but no catalyst. A sharp pre-crack was created in the tapered samples by gently tapping a razor blade into a molded starter notch. Load was applied in a direction perpendicular to the pre-crack (Mode I) with pin loading grips as shown in FIG. 2. The virgin fracture toughness was determined from the critical load to propagate the crack and fail the specimen. After failure, the load was removed and the crack allowed to heal at room temperature with no manual intervention. Fracture tests were repeated after 48 hours to quantify the amount of healing.

A representative load-displacement curve is plotted in FIG. 2 demonstrating ca. 75% recovery of the virgin fracture load. In great contrast, all three types of control samples showed no healing and were unable to carry any load upon reloading. A set of four independently prepared self-healing composite samples showed an average healing efficiency of 60%. When the healing efficiency is calculated relative to the critical load for the virgin, neat resin control (upper horizontal line in FIG. 2), a value slightly greater than 100% is achieved. The average critical load for virgin self-healing samples containing capsules and Grubbs' catalyst was 20% larger than the average value for the neat epoxy control samples, indicating that the addition of capsules and catalyst increases the inherent toughness of the epoxy.

Obviously, numerous modifications and variations of the present invention are possible in light of the above teachings. It is therefore to be understood that within the scope of the appended claims, the invention may be practiced otherwise than as specifically described herein.

What is claimed is:

1. A composite material, comprising:
   (i) a polymer,
   (ii) a polymerizer,
   (iii) a corresponding catalyst for the polymerizer, and
   (iv) a plurality of capsules,
   wherein the polymerizer is in the capsules; and
   wherein the polymerizer comprises at least one monomer selected from the group consisting of cyclic olefins, lactones, lactams, acrylates, acrylic acids, alkyl acrylates, alkyl acrylic acids, styrenes, isoprene and butadiene.

2. The composite material of claim 1, wherein the polymerizer comprises cyclic olefins.

3. The composite material of claim 1, wherein the polymer comprises at least one member selected from the group consisting of polyamides, polyesters, polycarbonates, polyethers, polyimides, phenol-formaldehyde resins, amine-formaldehyde resins, polysulfones, poly(acrylonitrile-butadiene-styrene), polyurethanes, polyolefins, and polysilanes.

4. The composite material of claim 1, wherein the polymer comprises at least one member selected from the group consisting of polyesters and polyethers.

5. The composite material of claim 1, wherein the corresponding catalyst for the polymerizer comprises at least one member selected from the group consisting of ROMP catalysts and cyclic ester polymerization catalysts.

6. The composite material of claim 1, wherein the corresponding catalyst for the polymerizer comprises a ROMP catalyst.

7. The composite material of claim 1, wherein the capsules have an aspect ratio of 1:1 to 1:2, and an average diameter of 10 nm to 1 mm.

8. The composite material of claim 1, wherein the capsules comprise a polymer of urea and formaldehyde, gelatin, polyurea, and polyamide.

9. The composite material of claim 1, wherein
   the polymerizer comprises DCPD,
   the polymer comprises epoxy,
   the corresponding catalyst for the polymerizer comprises a Grubbs catalyst,
   the capsules have an aspect ratio of 1:1 to 1:1.5, and an average diameter of 30–300 µm, and
   the capsules comprise a polymer of urea and formaldehyde.

10. The composite material of claim 1, wherein
    the polymerizer comprises DCPD,
    the polymer comprises poly(DCPD),
    the corresponding catalyst for the polymerizer comprises a Grubbs catalyst, and
    the capsules have an aspect ratio of 1:1 to 1:1.5, and an average diameter of 30–300 µm.

11. The composite material of claim 1, wherein
    the polymerizer comprises caprolactone,
    the polymer comprises poly(caprolactone),
    the corresponding catalyst for the polymerizer comprises a scandium triflate, and
    the capsules have an aspect ratio of 1:1 to 1:1.5, and an average diameter of 30–300 µm.

12. A method for making the composite of claim 1, comprising:
    dispersing the capsules and the corresponding catalyst into the polymer.

* * * * *